United States Patent
Bachl et al.

(10) Patent No.: US 7,929,962 B2
(45) Date of Patent: Apr. 19, 2011

(54) METHOD FOR CONTROLLING RADIO COMMUNICATIONS DURING IDLE PERIODS IN A WIRELESS SYSTEM

(75) Inventors: Rainer Walter Bachl, Nuremberg (DE); Fang-Chen Cheng, Morris Plains, NJ (US); Lei Song, Morris, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 525 days.

(21) Appl. No.: 11/415,945

(22) Filed: May 1, 2006

(65) Prior Publication Data

US 2007/0254598 A1 Nov. 1, 2007

(51) Int. Cl.
*H04W 24/00* (2009.01)
(52) U.S. Cl. .......... 455/424; 370/230.1; 370/235; 370/329; 370/335; 370/338; 370/342; 370/441; 370/468
(58) Field of Classification Search .......... 455/424; 370/335, 342, 441, 230.1, 235, 329, 338, 370/468
See application file for complete search history.

(56) References Cited

U.S. PATENT DOCUMENTS

| | | | | |
|---|---|---|---|---|
| 6,081,524 A * | 6/2000 | Chase et al. | .......... | 370/389 |
| 6,456,604 B1 * | 9/2002 | Lee et al. | .......... | 370/328 |
| 6,621,809 B1 * | 9/2003 | Lee et al. | .......... | 370/335 |
| 6,834,190 B1 * | 12/2004 | Lee et al. | .......... | 455/436 |
| 7,835,262 B2 * | 11/2010 | Balakrishnan et al. | ....... | 370/207 |
| 2001/0024431 A1 * | 9/2001 | Koo et al. | .......... | 370/335 |
| 2002/0071445 A1 * | 6/2002 | Wu et al. | .......... | 370/441 |
| 2003/0193915 A1 * | 10/2003 | Lee et al. | .......... | 370/335 |
| 2003/0223396 A1 * | 12/2003 | Tsai et al. | .......... | 370/342 |
| 2004/0013103 A1 * | 1/2004 | Zhang et al. | .......... | 370/345 |
| 2004/0196820 A1 * | 10/2004 | Hsu et al. | .......... | 370/342 |
| 2005/0118981 A1 * | 6/2005 | Laroia et al. | .......... | 455/343.3 |
| 2006/0166676 A1 * | 7/2006 | Rajkotia et al. | .......... | 455/452.2 |

FOREIGN PATENT DOCUMENTS

| | | |
|---|---|---|
| WO | 03010984 | 2/2003 |
| WO | WO 03/058829 A2 | 7/2003 |

OTHER PUBLICATIONS

International PCT Search Report PCT/US2007/009847 and Written Opinion mailed Nov. 14, 2007.
TR 25.814, Physical Layer Aspects for Evolved UTRA, $3^{rd}$ Generation Partnership Project; "Technical Specification Group Radio Access Network; Physical layer aspects for evolved Universal Terrestrial Radio Access (UTRA)" Release 7, Jun. 2006.
Abstract of KR 200100887488(A), "Method for Assigning Bandwidth to a Plurality of Users on Communication Network and Recording Medium Therefor" Sep. 21, 2001.

* cited by examiner

*Primary Examiner* — Patrick N Edouard
*Assistant Examiner* — Liton Miah
(74) *Attorney, Agent, or Firm* — Williams, Morgan & Amerson

(57) ABSTRACT

A method is provided for maintaining synchronization between an AT and a base station during an idle period. During the idle period, a reduced number of uplink reference signals for uplink channel quality estimation are sent to the base station by the AT. The uplink reference signals are sent to assist coherent demodulation and uplink channel quality estimation for scheduling. During the uplink idle period, the numbers of uplink reference signals are designed to be reduced in selective coherent bandwidths. The selection of the coherent bandwidth alternates in time and covers the entire spectrum to allow the channel quality estimation through the entire spectrum.

19 Claims, 4 Drawing Sheets

METHOD FOR CONTROLLING RADIO COMMUNICATIONS DURING IDLE PERIODS IN A WIRELESS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a typical system 100, as shown in FIG. 1, includes a plurality of base stations 130 (e.g., Node Bs) distributed within an area to be serviced by the system. Various Access Terminals 120 (ATs, also known as User Equipment (UE), mobile devices, and the like) within the area may then access the system and, thus, other interconnected telecommunications systems, such as a publicly switched telephone system (PSTN) 160 and a Data network 125, via one or more of the base stations 130. Typically, an AT 120 maintains communications with the system 100 as it passes through an area by communicating with one and then another base station 130, as the AT 120 moves. The AT 120 may communicate with the closest base station 130, the base station 130 with the strongest signal, the base station 130 with a capacity sufficient to accept communications, etc. The base stations 130, in turn, communicate with a Radio Network Controller (RNC) 138, which communicates with a core network 165. Each RNC 138 is capable of supporting a plurality of base stations 130.

In systems employing Universal Mobile Telephone System (UMTS) Long Term Evolution (LTE), communications are accomplished from the AT 120 to the base station 130 (i.e., the up-link (uplink)) using a packet switching system to increase system bandwidth utilization. However, scheduling of communications in the uplink has typically employed schemes, such as Hybrid Automatic Repeat reQuest (HARQ), that rely on feedback and control information from the opposite direction (e.g., down-link) to optimize performance. A substantial portion of the feedback information is characterized by its time sensitive nature and small packet size. The timing of data arrival in such a bi-direction interactive system presents a foreseeable challenge in the system design of uplink on-demand type scheduling schemes.

Multiplexing schemes for the feedback and control information (e.g., uplink pilot, data, and data associated L1/L2 control signaling) have been specified in section 9.1.1.2.3 of TR 25.814, Physical Layer Aspects for Evolved UTRA, 3GPP. The multiplexing schemes are designed to operate in the active mode in a Radio Resource Control (RRC) Connected state/LTE Active mode. Most technologies and access control studies focus on the active mode, which has a relatively long data transmission period. Multiplexing and control schemes that may be used during the idle and transient periods are not fully addressed in the technical report.

However, the general guideline in a packet type system is to shut down the connectivity when the idle period is long, so as to conserve power and resources. Once the connectivity is shut down, however, the AT 120 must re-request the connection after the idle period ends. However, the process used for re-requesting the connection is complicated and relative low in efficiency.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the instant invention, a method is provided for managing radio resources. The method comprises transmitting reference signals at a first rate during an active state, and transmitting reference signals at a second rate during an idle period.

In another aspect of the instant invention, a method is provided for managing radio resources. The method comprises receiving reference signals at a first rate during an active state, and receiving reference signals at a second rate during an idle period.

BRIEF DESCRIPTION OF THE DRAWINGS

The invention may be understood by reference to the following description taken in conjunction with the accompanying drawings, in which like reference numerals identify like elements, and in which.

Figure 1:
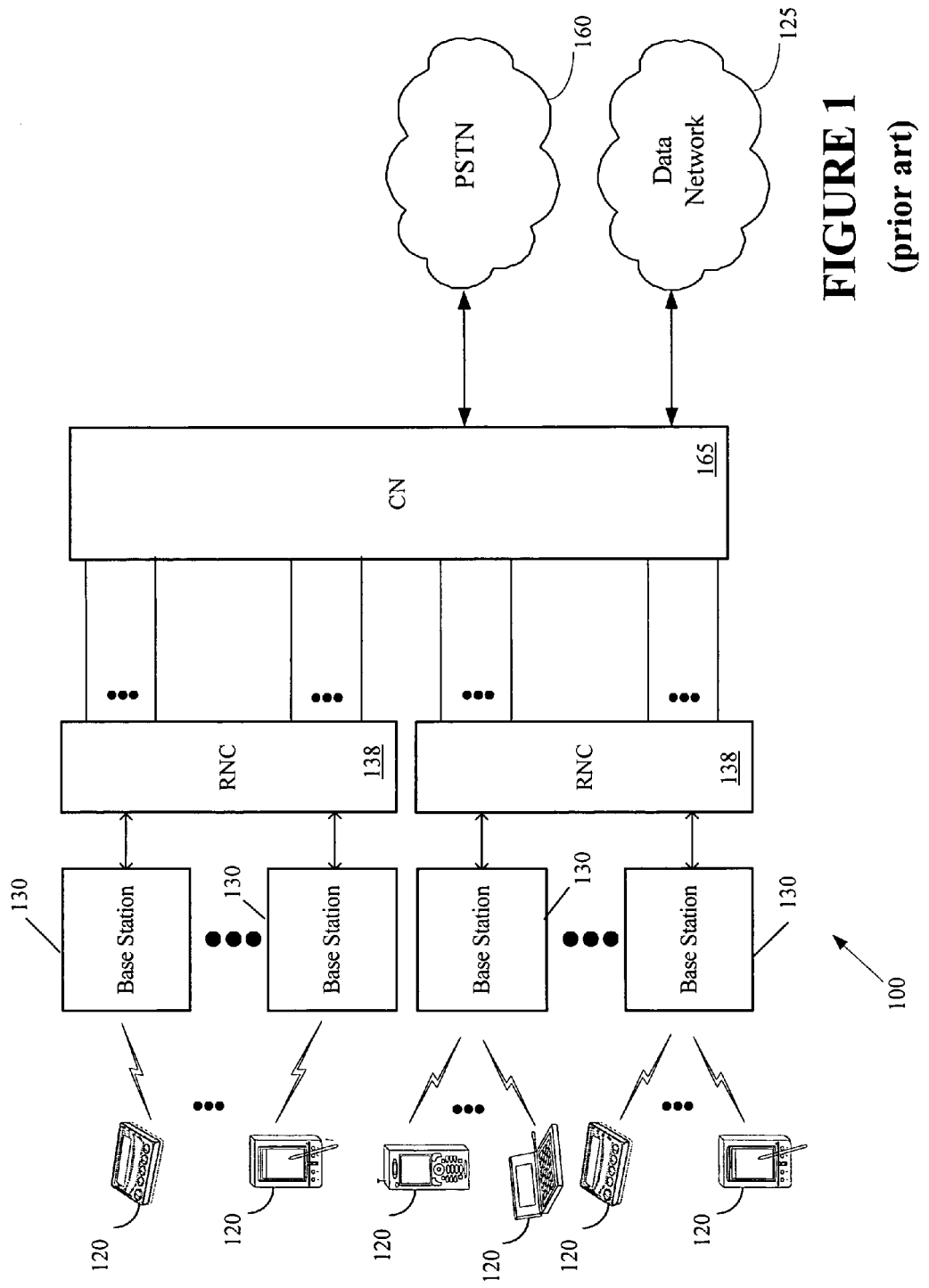
FIG. 1 is a block diagram of a prior art communications system, such as a Universal Mobile Telephone System (UMTS) in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation may be described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The uplink multiplexing and control schemes set forth in section 9.1.1.2.3 of TR 25.814 discussed above, specify three multiplexing combinations for the uplink pilot, data, and L1/L2 control signaling within a sub-frame. The uplink transmission frequency and the data structure of the data and control information are designed to optimize the performance of the scheduler and the enable technologies based on the continuous activities. The uplink access and transmission are mainly controlled by the base station 130 (also known as e-NodeB) to optimize the overall system performance. The uplink access strategy is assumed as an on-demand type of access to maximize the radio resource utilization. The data and control channels are assumed to be disconnected during uplink idle or transient states. An uplink access request is resumed when the uplink state is changed from the idle state to the active state. The penalty for completely shutting down the uplink physical channel during the idle state is the loss of uplink synchronization. The loss of uplink synchronization will require performing the following procedures to enable an uplink re-access.

Non-synchronized Random Access Channel (RACH) procedure—The performance of the non-synchronized access procedure will be degraded if uplink access requests are received very frequently. This could happen quite often for the interactive and conversational applications, such as gaming and Voice Over Internet Protocol (VoIP) applications.

uplink Synchronization procedure and timing adjustment.

Initial training of the radio channel quality estimation for the uplink scheduler.

The aforementioned procedures are time consuming and costly in terms of radio resource usage. The cost of lost synchronization is comparably small to the gain of the radio resource utilization if the uplink traffic has long inter-arrival time. However, the L1/L2 feedback control signaling information, such as Ack/Nack and CQI reports, for the downlink transmission might be needed for continuous downlink transmission during the uplink idle period.

On the other hand, continuing the uplink physical channel during the idle period would allow the system to maintain uplink synchronization and to instantaneously schedule uplink transmission when data arrives. The radio resource utilization would decrease as a result of maintaining the uplink physical channel during the idle state if the idle period is long. uplink. The uplink physical channel structure during the idle period has at least two significant design considerations. The first consideration of uplink physical channel design during idle period is the uplink feedback channel design for the downlink transmission. The uplink feedback channel carries the control information, such as Ack/Nack and CQI reports, for the downlink transmission. The consideration of the uplink feedback channel should be decoupled from the other control information during the uplink idle period since the downlink and uplink traffic arrival are uncorrelated in time and in pattern.

A second consideration of uplink physical channel design is the pilot and L1/L2 control information for the uplink data transmission. The uplink pilot and control signaling during the uplink idle state is used to avoid frequent asynchronous RACH access and uplink re-synchronization. The design of the uplink pilot transmission also involves the availability of the uplink radio channel condition for the uplink scheduler.

The bandwidth on-demand type of uplink Single Carrier Frequency Division Multiple Access (SC-FDMA) system in LTE allows flexible bandwidth allocation and management for the uplink transmission. However, it presents a challenge in designing the minimal overhead for the small feedback information. The uplink Ack/Nack and CQI reports for the downlink transmission are required disregarding any uplink activities. The AT 120 constantly transmits the CQI reports for the downlink schedulers since the AT 120 has no information on the downlink packet arrival. The Ack/Nack is time sensitive information for the HARQ operation. Thus, the resource allocation in frequency and time for the uplink Ack/Nack transmission may be constantly scheduled or configured in advance. Since the downlink transmissions are continuous activities among all active users in the cell, it would be more efficient to partition a fraction of the radio resource (in time, in frequency, or in both time and frequency) for the uplink feedback channel shared by all users in the system The frequency and the report type of the feedback information may be configuration parameters. The bandwidth allocation of the uplink fast feedback channel could be dynamic through the broadcast or scheduler indication channel based on the current system load. The radio resource allocation of an uplink fast feedback channel also allows maintaining the uplink synchronization. Maintaining the uplink synchronization will reduce the cost of complicated non-synchronized procedure to re-gain the uplink access.

Figure 2:
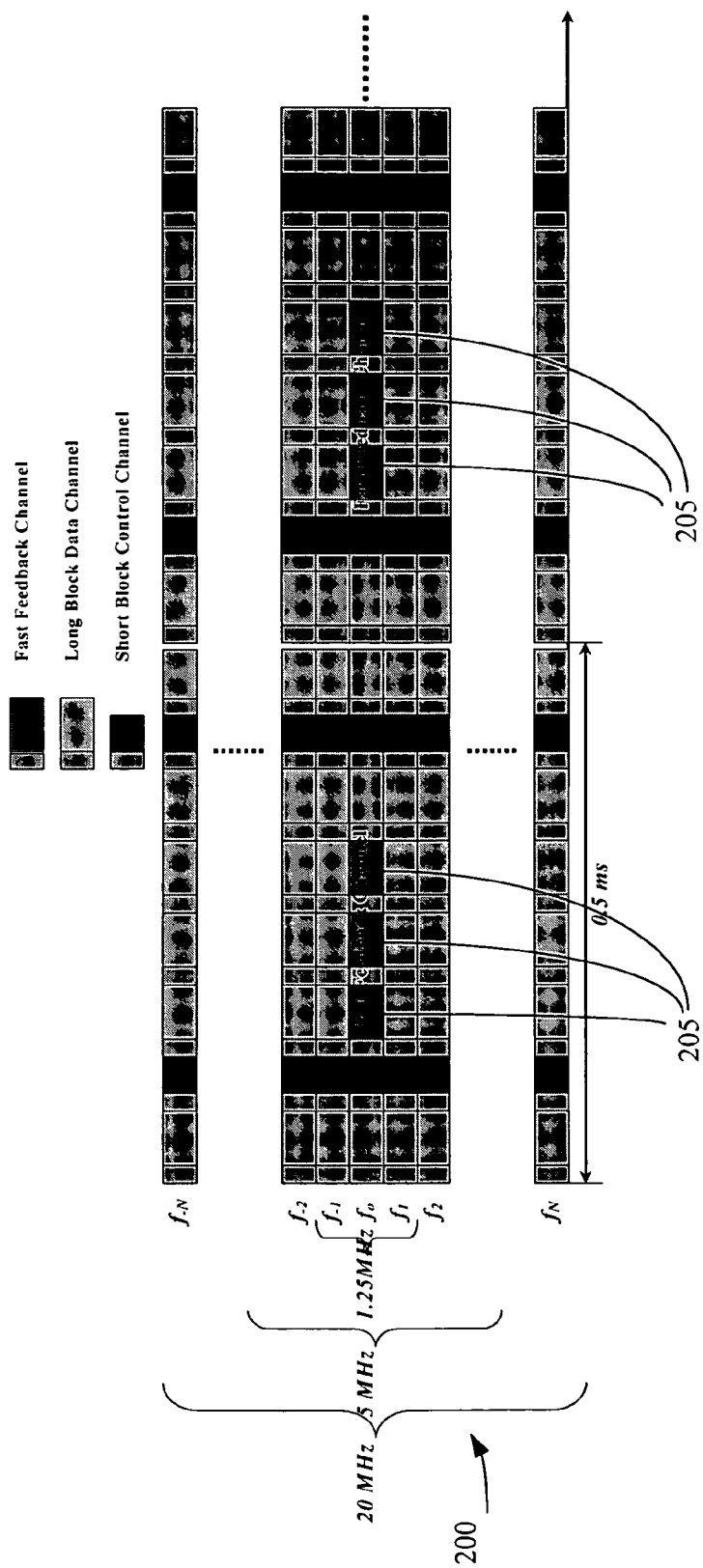
FIG. 2 illustrates a stylistic representation of an exemplary allocation of the frequency of the control channels for multiple bandwidth operations.

FIG. 2 is an example of the frequency allocation of the control channels for multiple bandwidth operations. The control channels include the Channel Quality Indication (CQI) reports and Acknowledgement/Negative Acknowledgement (Ack/Nack) feedback for Hybrid Automatic Repeat ReQuest (H-ARQ) channels for downlink transmission. The control channels are allocated such that a central part 200 of the spectrum is a unique location that the ATs 120 operating at various bandwidths may use to access the system. The frequency allocation of the control channel is designed for the ATs 120 to tune the transmission carrier frequency to the central part of the spectrum for fast feedback when the mobiles are operating at various bandwidths (e.g., 1.25 Mhz, 2.5 MHz, 5 MHz, 10 MHz, 15 MHz, 20 MHz, etc.). The design of the fast feedback channel 205 at the central part 200 of the frequency benefits the radio resource management.

To support the scalable bandwidth, the uplink fast feedback channel 205 is allocated at the central resource block 200 to allow feedbacks to occur substantially simultaneously from scalable bandwidths 1.25/2.5/5/10/15/20 MHz, as shown in FIG. 2. That is, a relatively unsophisticated AT 120 configured to operate at a reduced bandwidth of 1.25 MHz and a relatively sophisticated AT 120 configured to operate at an expanded bandwidth of 20 MHz may both provide feedback at substantially the same time. The radio resource configuration for the fast feedback channel 205 needs to be incorporated into an interference mitigation scheme for effective feedback reporting among cells. The number of a long block configured for the fast feedback channel could be flexible through L1/L2/L3 signaling depending on the length of the CQI report and HARQ type.

CQI report—The length of the CQI report depends on the enable technologies, such as frequency selective scheduler or Multiple-Input, Multiple-Output (MIMO). Different length, format, coding protection and transmitted frequency of the CQI reports could be supported to minimize the CQI overhead for different enabling technologies. The uplink radio resource and parameters of the CQI reports could be configured through L3 signaling in the beginning of the call setup and reconfigured dynamically through L1/L2/L3 signaling on the fly. The constant CQI reports in time also provide a reference of the uplink channel quality estimation for the uplink scheduler.

Ack/Nack—The Ack/Nack feedback associated with each HARQ process. If the uplink resource block is reserved for the fast feedback channel in advance and shared by all users, an indication of the frequency sub-carrier and the symbol of given sub-frame for the Ack/Nack feedback could be piggybacked on the MAC overhead of each HARQ processor. Multiple types of Ack/Nack feedback error protection could be supported. The type of the error protection could be configured through L3 signaling in the beginning of the call setup and reconfigured through L1/L2/L3 signaling in the middle of the call. These would allow the scheduler to allocate the downlink resource for the HARQ operation and its associated uplink resource for the Ack/Nack operation at the same time.

The packet switching uplink scheduling system in LTE allows flexible bandwidth management of the uplink access but frequent communication in bandwidth request and allocation between the AT 120 and the base station 130. Since the uplink scheduler is located at the base station 130, the challenge of the uplink access is for the AT 120 to send the scheduling request to the base station 130 at each data burst effectively. The uplink pilot, data, and control signaling schemes shown in FIGS. 9.1.1.23-1 and 9.1.1.23-2 in TR 25.814 are designed for the active mode. The uplink fast feedback channel design allows the AT 120 to report the CQI constantly with shared radio resource but also to maintain the uplink synchronization. The constant uplink CQI reports could provide the coarse uplink channel quality estimation for the uplink scheduler. The missing uplink pilots prevent the uplink scheduler from obtaining a frequency selective scheduling gain. A training period is required when the uplink pilots are reinitiated. If the uplink pilots are sent during the idle period, the uplink radio resource utilization will decrease in proportion to the number of the users in a cell. The pilot structure in 9.1.1.2.3 of TR 25.814 is designed to have the pilot cross all physical resource blocks in the short block symbols. For FDM pilots, each user occupied one pilot subcarrier in each resource block. Thus, a maximum of 12 ATs 120 can send the pilots in a short block interval. Maintaining the pilots for all resource blocks might not be necessary during the uplink idle period.

Figure 3:
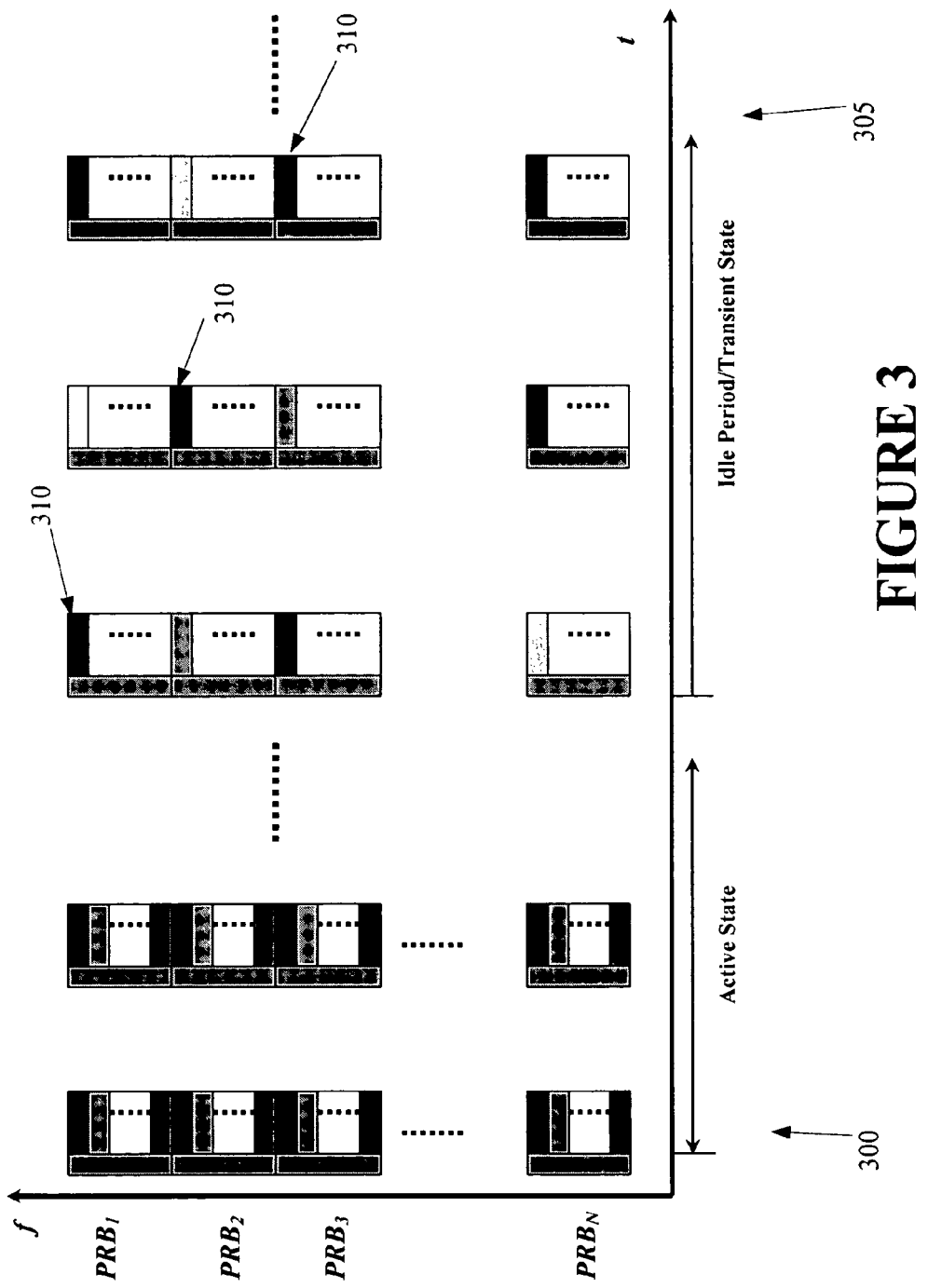
FIG. 3 is an exemplary stylistic representation of a reduced number of uplink reference signals for uplink channel quality estimation during an idle period.

In one embodiment of the instant invention, the pilot transmission occurs in selective resource blocks at a time during the uplink idle period to allow other ATs 120 in the idle period to use the no-occupied subcarriers in the other non-selected resource blocks as shown in FIG. 3. The pilots 310 of a specific AT 120 are transmitted on the entire spectrum during the active state as shown by element 300 of FIG. 3. The AT 120 sends the pilot on only one selective coherent bandwidth at a time and in alternation at the other time to cover the entire bandwidth during idle period as shown by element 305. An example in FIG. 3 shows that the pilots 310 are sent in the order of the 1st, 2nd, 3rd, to the Nth coherent bandwidth at each short block instance during the idle period. The reduced number of the uplink pilots allows more users to share the short block during the idle period. An alternate coherent bandwidth allocation strategy also provides sufficient uplink radio channel quality information for the scheduler to schedule uplink transmission when the data arrives.

FIG. 3 is an example of a reduced number of uplink reference signals for uplink channel quality estimation when no uplink data is stored in the buffer and ready for scheduled transmission (i.e., an idle period). The uplink reference signals are sent to assist coherent demodulation and uplink channel quality estimation for scheduling. During the uplink idle period with no data for transmission, the numbers of uplink reference signals are designed to be reduced in selective coherent bandwidth. The selection of the coherent bandwidth alternates in time and covers the entire spectrum to allow the channel quality estimation through the entire spectrum. FIG. 3 shows a shift version of the reduced uplink reference signals when no uplink data is ready for scheduled transmission. The uplink reference signals (310) are transmitted over all coherent bandwidths in the active state (300). The reference signals (310) are transmitted on only one selective coherent bandwidth at a time and alternate to the next coherent bandwidth in the idle state (305).

The pilot allocation and the selective pattern during the idle period could be configured in the beginning of the call setup. The transition of the pilot in full spectrum during the active period to the pilot in selective coherent bandwidth with alternation in time during the idle period could be indicated through L1/L2 signaling. The AT 120 could inform the base station 130 of a transition from active to idle periods through L1/L2 signaling piggybacked at the end of the data burst. The transition from idle to active periods could be indicated implicitly through uplink scheduling request.

The uplink fast feedback channel and pilot transmission in selective coherent bandwidth during the idle period allows the system to retain the uplink synchronization and radio channel quality indication for scheduling. This design is feasible for the short inter-arrival period of time. If the idle period or packet inter-arrival period is long, the selective pilot transmission scheme might be redundant. If both uplink and downlink are in long idle periods, there is no reason to maintain the uplink synchronization. The length of the data inter-arrival determines the efficiency of the fast feedback channel design. However, the data inter-arrival is not a foreseeable event. It is difficult to predict if the data inter-arrival time is long or short.

Figure 4:
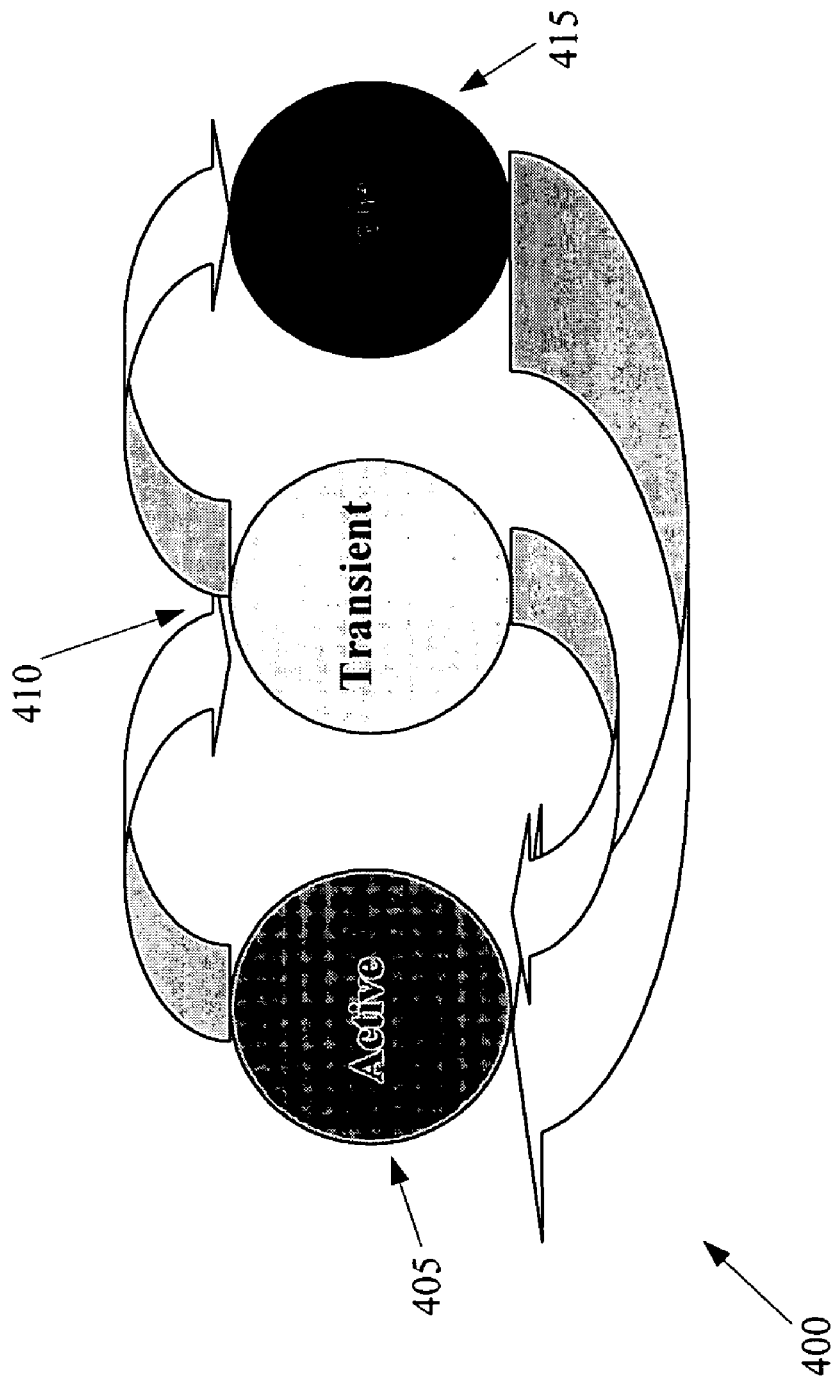
FIG. 4 is a state diagram representing the various states in which the ATs 120 may operate.

As shown in FIG. 4, a three-state machine 400 is defined for determining the length of data inter-arrival time. The three-state machine 400 consists of Active, Transient, and Idle states 405, 410, 415. The Active state 405 is the state when the data is actively arriving. The idle period contains the Transient and Idle state 410, 415. The Transient state 410 is used to identify or indicate the "short" idle period. In the Transient state 410, the uplink synchronization and selective pilot for uplink channel quality indication for scheduling are retained. The Idle state 415 is specified for the long idle period. The uplink physical resource will be removed during the Idle state 415. The state machine 400 will transition from the Active state 405 to the Transient state 410 when the idle period begins. A programmable timer may be set to determine when the state machine 400 is to transition to the Transient state 410. If no data arrives before the timer expires, the state machine 400 will transition from the Transient state 410 to the Idle state 415. On the other hand, if data arrives before the timer expires, then the state machine 400 transitions from the Transient state 410 to the Active state 405. The state transition is shown in FIG. 4.

It is believed that the uplink access control scheme in the idle period during the active mode would be beneficial for the overall system performance. An uplink fast feedback channel is designed to allow flexible bandwidth allocation and feedback formats for the downlink transmission in the idle period. The uplink fast feedback channel design also allows the system to maintain the uplink synchronization. The selective pilot with alternate allocation would allow the scheduler retaining the uplink channel quality for the preparation of the data scheduling during the uplink idle period. A long uplink idle period would degenerate the fast access channel design. A three-state machine is defined to allow the system to identify the length of the idle period. The three-state machine also allows the system to shut down the uplink radio resource when the Idle period is long.

Those skilled in the art will appreciate that the various system layers, routines, or modules illustrated in the various embodiments herein may be executable control units. The controllers may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the controllers cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for managing radio resources in a wireless communication system that supports a plurality of scalable bandwidths, each of the scalable bandwidths being centered on a selected center frequency and each of the scalable bandwidths supporting a different number of parallel coherent bandwidths, wherein each coherent bandwidth is temporally divided into resource blocks, comprising:

tuning an access terminal to the selected center frequency of the plurality of scalable bandwidths;

transmitting, from the access terminal on one of the scalable bandwidths, at least one reference signal at a first rate during an active state such that said at least one reference signal is transmitted in a portion of each resource block of each of the parallel coherent bandwidths; and transmitting, from the access terminal on said one of the scalable bandwidths, said at least one reference signal at a second rate during an idle period such that said at least one reference signal is transmitted in a portion of one resource block of one of the parallel coherent bandwidths per time interval and said at least one reference signal is not transmitted in the other resource blocks of the remaining parallel coherent bandwidths during this time interval, and wherein said one of the parallel coherent bandwidths used to transmit said at least one reference signal changes in successive time intervals.

2. A method, as set forth in claim 1, wherein the first rate is higher than the second rate.

3. A method, as set forth in claim 1, wherein transmitting said at least one reference signal at the second rate during the idle period further comprises transmitting said at least one reference signal over said one of the plurality of scalable bandwidths.

4. A method, as set forth in claim 3, wherein transmitting said at least one reference signal over said one of the plurality of scalable bandwidths further comprises serially transmitting said at least one reference signal over said one of the plurality of scalable bandwidths.

5. A method, as set forth in claim 3, wherein transmitting said at least one reference signal over said one of the plurality of scalable bandwidths further comprises alternating the coherent bandwidth over which said at least one reference signal is transmitted during successive time intervals.

6. A method, as set forth in claim 1, wherein transmitting said at least one reference signal at the second rate during the idle period further comprises discontinuing the transmission of the at least one reference signal in response to the idle period being longer than a preselected setpoint.

7. A method, as set forth in claim 1, further comprising estimating channel quality based on the reference signals.

8. A method, as set forth in claim 7, further comprising maintaining synchronization during the idle period based on the reference signals transmitted at the second rate.

9. A method, as set forth in claim 1, wherein transmitting said at least one reference signal at the second rate during the idle period further comprises transmitting the at least one reference signal on only one coherent bandwidth at a time.

10. A method, as set forth in claim 1, wherein transmitting said at least one reference signal at the second rate during the idle period further comprises transmitting the at least one reference signal serially on a plurality of coherent bandwidths.

11. A method for managing radio resources in a wireless communication system that supports a plurality of scalable bandwidths, each of the scalable bandwidths being centered on a selected center frequency and each of the scalable bandwidths supporting a different number of parallel coherent bandwidths, wherein each coherent bandwidth is temporally divided into resource blocks, comprising:

determining, at a base station, one of the scalable bandwidths used by an access terminal;

receiving, at the base station from the access terminal over said one of the scalable bandwidths, at least one reference signal at a first rate during an active state such that said at least one reference signal is received in a portion of each resource block of each of the parallel coherent bandwidths; and receiving, at the base station over said one of the scalable bandwidths, said at least one reference signal at a second rate during an idle period such that said at least one reference signal is received in a portion of one resource block of one of the parallel coherent bandwidths per time interval and said at least one reference signal is not received in the other resource blocks of the remaining parallel coherent bandwidths during this time interval, and wherein said one of the parallel coherent bandwidths used to transmit said at least one reference signal changes in successive time intervals.

12. A method, as set forth in claim 11, wherein the first rate is higher than the second rate.

13. A method, as set forth in claim 11, wherein receiving said at least one reference signal at the second rate during the idle period further comprises receiving said at least one reference signal over said one of the plurality of scalable bandwidths.

14. A method, as set forth in claim 13, wherein receiving said at least one reference signal over said one of the plurality of scalable bandwidths further comprises serially receiving said at least one reference signal over said one of the plurality of scalable bandwidths.

15. A method, as set forth in claim 13, wherein receiving said at least one reference signal over said one of the plurality of scalable bandwidths further comprises alternating the bandwidth over which said at least one reference signal is received.

16. A method, as set forth in claim 11, wherein receiving said at least one reference signal at the second rate during the idle period further comprises discontinuing the receipt of the at least one reference signal in response to the idle period being longer than a preselected setpoint.

17. A method, as set forth in claim 11, further comprising estimating channel quality based on the reference signals.

18. A method, as set forth in claim 17, further comprising maintaining synchronization during the idle period based on the reference signals transmitted at the second rate.

19. A method, as set forth in claim 11, wherein receiving said at least one reference signal at the second rate during the idle period further comprises receiving the at least one reference signal on only one selective coherent bandwidth at a time.

\* \* \* \* \*